(12) United States Patent
Yasunori

(10) Patent No.: US 10,714,288 B2
(45) Date of Patent: Jul. 14, 2020

(54) RELAY DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Hiromichi Yasunori, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 139 days.

(21) Appl. No.: 16/097,073

(22) PCT Filed: Apr. 28, 2017

(86) PCT No.: PCT/JP2017/016994
§ 371 (c)(1),
(2) Date: Oct. 26, 2018

(87) PCT Pub. No.: WO2017/195671
PCT Pub. Date: Nov. 16, 2017

(65) Prior Publication Data
US 2019/0115176 A1 Apr. 18, 2019

(30) Foreign Application Priority Data
May 13, 2016 (JP) .................................. 2016-097027

(51) Int. Cl.
*H01H 47/00* (2006.01)
*B60R 16/033* (2006.01)
(Continued)

(52) U.S. Cl.
CPC .......... *H01H 47/002* (2013.01); *B60R 16/02* (2013.01); *B60R 16/033* (2013.01); *H02J 7/00* (2013.01); *H02J 7/0063* (2013.01)

(58) Field of Classification Search
CPC .... H01H 47/002; B60R 16/02; B60R 16/033; H02J 7/00; H02J 7/0063
(Continued)

(56) References Cited

U.S. PATENT DOCUMENTS

2011/0140518 A1 6/2011 Hattori
2017/0080883 A1 3/2017 Yasunori et al.

FOREIGN PATENT DOCUMENTS

JP 2007-089350 A 4/2007
JP 2013-063775 A 4/2013
(Continued)

OTHER PUBLICATIONS

Jun. 20, 2017 International Search Report issued in International Patent Application No. PCT/JP2017/016994.
(Continued)

*Primary Examiner* — Hal Kaplan
(74) *Attorney, Agent, or Firm* — Oliff PLC

(57) ABSTRACT

A relay device includes a switch that switches a power line, serving as a path for power supplied from a first power storage device to a plurality of loads, between an electrified state and a non-electrified state; a first relay that switches a first conductive path, serving as a path from the switch to at least one specific load, between an electrified state and a non-electrified state; a second relay that switches a second conductive path, serving as a path between a second power storage device and the at least one specific load, between an electrified state and a non-electrified state; and a controller. When an abnormality has been detected by an abnormality detector, the controller causes the second relay to operate in
(Continued)

a manner corresponding to the operation of the first relay that was being performed before detection of the abnormality.

4 Claims, 5 Drawing Sheets

(51) Int. Cl.
*H02J 7/00* (2006.01)
*B60R 16/02* (2006.01)

(58) Field of Classification Search
USPC .......................................................... 307/115
See application file for complete search history.

(56) References Cited

FOREIGN PATENT DOCUMENTS

| | | |
|---|---|---|
| JP | 2015-083404 A | 4/2015 |
| JP | 2015-217734 A | 12/2015 |

OTHER PUBLICATIONS

Nov. 16, 2017 International Preliminary Report on Patentability issued in International Patent Application No. PCT/JP2017/015994.

|  | BEFORE OCCURENCE OF ABNORMALITY | AFTER OCCURENCE OF ABNORMALITY |
|---|---|---|
| FIRST SWITCHING RELAY | ON | OFF |
| SECOND SWITCHING RELAY | OFF | OFF |
| THIRD SWITCHING RELAY | OFF | ON |
| FOURTH SWITCHING RELAY | OFF | OFF |

FIG. 4A

|  | BEFORE OCCURENCE OF ABNORMALITY | AFTER OCCURENCE OF ABNORMALITY |
|---|---|---|
| FIRST SWITCHING RELAY | ON | OFF |
| SECOND SWITCHING RELAY | ON | OFF |
| THIRD SWITCHING RELAY | OFF | ON |
| FOURTH SWITCHING RELAY | OFF | ON |

FIG. 4B

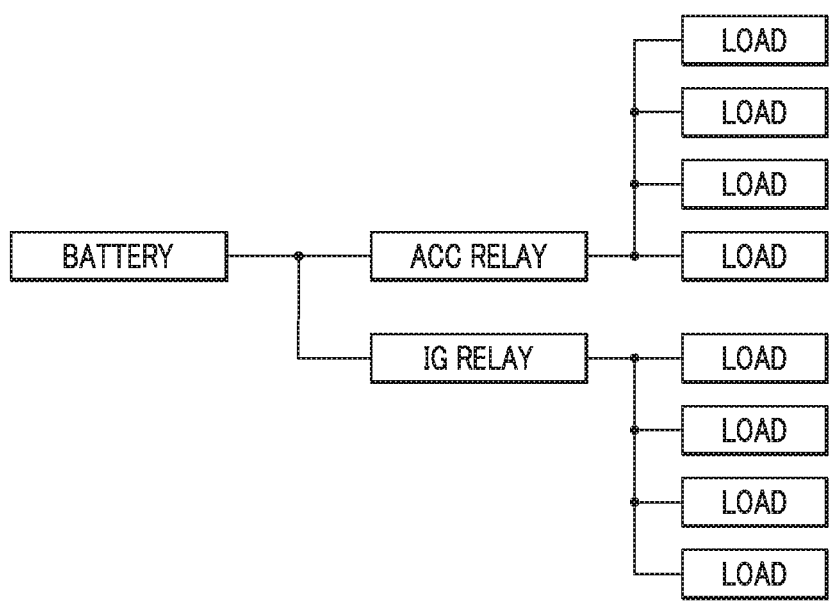

FIG. 5

RELAY DEVICE

The present invention relates to a relay device configured as a device associated with a power storage unit.

BACKGROUND

An example of a power supply device for a vehicle has been disclosed in JP 2015-83404 A. The power supply device disclosed in JP 2015-83404 A has a first power supply that supplies electric power to onboard loads, a second power supply that supplies electric power to the onboard loads, a connection switching unit that connects and disconnects the onboard loads and the second power supply, and a control unit that controls the connection switching unit. When the amount of power remaining in the second power supply is not within a predetermined range, the connection switching unit is controlled to perform a first control operation in which the second power supply is disconnected from the onboard loads. When it has been determined based on the state of the first power supply that power has to be supplied to the onboard loads from the second power supply, even if the amount of power remaining in the second power supply is not within the predetermined range, a second control operation is performed, which is given priority over the first control operation, in which the second power supply remains connected at least to a specific onboard load among the onboard loads.

SUMMARY

FIG. 5 shows a power supply system of the prior art in which there is only a single battery. In this power supply system, an accessory relay (ACC relay) and an ignition relay (IG relay) are provided in the power line from the battery, and a plurality of loads is connected downstream from each of these relays. Because the supply of power to these loads is stopped when the main battery fails or the like, it is difficult to apply this type of power supply system to a vehicle in which there are loads to which the power supply must not cease, or loads for which an interruption of power supply must be avoided if at all possible, or the like. In response to this problem, a dual power supply system such as that described in Patent Document 1 can supply power from a sub-battery when the main battery fails.

However, a system using two power supplies in this manner increases the electrical power system and increases the number of relays required. This increases the scale of the configuration and the number of parts. This problem will be explained below in greater detail with reference to FIG. 6.

FIG. 6 is a schematic diagram of a dual power supply system including a main battery and a sub-battery. This system is configured so that power can be supplied to specific loads A, B from the sub-battery. The sub-battery side of the power system is usually kept in the OFF state. When an abnormality occurs on the main battery side, the system on the sub-battery side is switched to the ON state and a supply of power is maintained to the specific loads A, B. For example, when a failure occurs on the main battery side while IG relay A and switching relay C are turned ON and power is being supplied from the main battery to specific load B, a separation relay, IG relay A, and switching relay C are turned OFF, and IG relay B and switching relay D are turned ON, whereby power is supplied to specific load B from the sub-battery. Therefore, specific load B can be operated even when an abnormality has occurred on the main battery side.

However, when a sub-battery is used in this dual power supply system to supply power when an abnormality occurs in the main battery, the power supply state on the main battery side when the abnormality occurs must be reflected, and the sub-battery must supply power only to the specific load that was receiving power when the abnormality occurred. For example, when ACC relay A shown in FIG. 6 is turned ON and IG relay A is turned OFF when an abnormality occurs on the main battery side (that is, when power is being supply only to specific load A among the specific loads A, B), the same power supply state has to be maintained after the abnormality occurs so that power is supplied only to specific load A. Alternatively, when both ACC relay A and IG relay A are turned ON when an abnormality occurs in the main battery (that is, when both specific loads A, B are receiving a supply of power), the same power supply state has to be maintained after the abnormality occurs so that power is supplied to both specific loads A, B. In the example shown in FIG. 6, a separate accessory relay (ACC relay B) and ignition relay (IG relay B) are provided in the path from the sub-battery to the specific loads A, B in order to implement this type of operation. In this configuration, when the IG relay is turned ON and power is being supplied to specific load B before an abnormality occurs in the main battery, the IG relay can remain turned ON in the path from the sub-battery after the abnormality occurs to continue the supply of power to specific load B. Conversely, when the IG relay is turned OFF before an abnormality occurs in the main battery, the IG relay can remain turned OFF in the path from the sub-battery after the abnormality occurs to block the supply of power to specific load B. The same situation occurs in the case of the operation state of the ACC relay before and after an abnormality occurs.

However, because an accessory relay (ACC relay) and ignition relay (IG relay) also have to be provided in the path on the sub-battery side as in FIG. 6 in order to implement this type of operation, the scale of the equipment and the number of parts must increase.

The present invention was made based on the circumstances described above, and has an object of implementing a relay device with a simpler configuration which is able to switch or maintain the state of a path to a specific load from a second power storage unit to reflect the path to the specific load from a first power storage unit if an abnormality occurs on the first power storage unit side.

A relay device of a first invention comprises:

a switch that switches a power line, serving as a path for power supplied from a first power storage device to a plurality of loads, between an electrified state and a non-electrified state, a first relay that switches a first conductive path, serving as a path from the switch to at least one specific load, between an electrified state and a non-electrified state, a second relay that switches a second conductive path, serving as a path between a second power storage device and the at least one specific load, between an electrified state and a non-electrified state, and a controller that causes the operation of the second relay to be turned OFF until an abnormality is detected by an abnormality detector, and, when the abnormality has been detected by the abnormality detector, causes the second relay to operate in a manner corresponding to the operation of the first relay that was being performed before detection of the abnormality by the abnormality detector.

The controller is configured to detect a state of the switch.

Before the abnormality is detected by the abnormality detector, the controller causes the first relay to be turned ON when the switch has been turned ON, and causes the first relay to be turned OFF when the switch has been turned OFF.

When the abnormality has been detected by the abnormality detector, the controller causes the second relay to operate in a manner corresponding to the operation of the first relay that was being performed up until detection of the abnormality by the abnormality detector, based on the state of the switch detected by the controller.

A relay device of a second invention comprises:

a first switch that switches a first power line, serving as a path for power supplied from a first power storage device to a plurality of loads of a first type, between an electrified state and a non-electrified state, a first switching relay that switches a first individual conductive path, serving as a path from the first switch to a first specific load, between an electrified state and a non-electrified state, a second switch that switches a second power line, serving as a path for power supplied from the first power storage device to a plurality of loads of a second type, between an electrified state and a non-electrified state, a second switching relay that switches a second individual conductive path, serving as a path from the second switch to a second specific load, between an electrified state and a non-electrified state, a third switching relay that switches a third individual conductive path, serving as a path from a second power storage device to the first specific load, between an electrified state and a non-electrified state, and a fourth switching relay that switches a fourth individual conductive path, serving as a path from the second power storage device to the second specific load, between an electrified state and a non-electrified state, and a controller that causes the operation of the third switching relay and the fourth switching relay to be turned OFF until an abnormality is detected by an abnormality detector, and, when the abnormality has been detected by the abnormality detector, causes the third switching relay and the fourth switching relay to operate in a manner corresponding, respectively, to the operations of the first switching relay and the second switching relay that were being performed before detection of the abnormality by the abnormality detector.

The controller is configured to detect a state of the first switching relay and the second switching relay.

Until the abnormality is detected by the abnormality detector, the controller causes the operation of the first switching relay to be turned OFF and ON in a manner corresponding to the OFF and ON operation of the first switch, and causes the operation of the second switching relay to be turned OFF and ON in a manner corresponding to the OFF and ON operation of the second switch.

When an abnormality has been detected by the abnormality detector, the controller respectively causes the third switching relay and the fourth switching relay to operate in a manner corresponding to the respective operations of the first switching relay and the second switching relay that were being performed up until detection of the abnormality by the abnormality detector, based on the state of the first switching relay and the second switching relay detected by the controller.

The first invention has a first relay that switches a first conductive path serving as a path from a switch (a unit that switches a power line serving as the path for power supplied from a first power storage device to a plurality of loads from an electrified state to a non-electrified state) to at least one specific load between an electrified state and a non-electrified state, and a second relay that switches a second conductive path serving as a path from a second power storage device to at least one specific load between an electrified state and a non-electrified state. This configuration can supply power to at least one specific load not only from the first power storage device but also from the second power storage device.

The first invention also has a controller that causes the operation of the second relay to be turned OFF until an abnormality is detected, by an abnormality detector, in a path electrically connected to the first storage device, and, when an abnormality has been detected by the abnormality detector, causes the second relay to operate in a manner corresponding to the operation of the first relay that was being performed before detection of the abnormality by the abnormality detector. With this configuration, at normal times, before an abnormality has been detected in a path electrically connected to the first power storage device, the second relay is turned OFF to suppress electrical discharge from the second power storage device, and, when an abnormality has occurred in the path electrically connected to the first storage device, the second relay can be caused to operate in a manner corresponding to the operation of the first relay that was being performed before an abnormality was detected by the abnormality detector. As a result, the state of the power supply to a specific load after an abnormality occurs can be maintained the same as it was before the abnormality occurred. Also, even when a switching means having a function similar to a switch is not provided in a path from the second power storage device, switching can be realized in which the state of the path to the second power storage device (that is, the operation of the second relay) after an abnormality occurs reflects the state of the path between the first power storage device and the specific load before the abnormality occurred.

Thus, a relay device can be realized, with a simpler configuration, which is able to switch or maintain a path to a specific load from a second power storage device to reflect the path to the specific load from a first power storage device if an abnormality occurs on the first power storage device side.

The second invention has a first switching relay that switches a first individual conductive path, serving as a path from a first switch (a device that switches a first power line serving as a path for power supplied from a first power storage device to a plurality of loads of a first type between an electrified state and a non-electrified state) to a first specific load, between an electrified state and a non-electrified state, and a third switching relay that switches a third individual conductive path, serving as a path from a second power storage device to a first specific load, between an electrified state and a non-electrified state. This configuration can supply power to the first specific load not only from the first power storage device but also from the second power storage device.

Also provided are a second switching relay that switches a second individual conductive path, serving as a path from a second switch (a device that switches a second power line, serving as a path for power supplied from the first power storage device to a plurality of loads of a second type, between an electrified state and a non-electrified state) to a second specific load, between an electrified state and a non-electrified state, and a fourth switching relay that switches a fourth individual conductive path, serving as a path from the second power storage device to a second specific load, between an electrified state and a non-electrified state. This configuration can supply power to the second specific load not only from the first power storage device but also from the second power storage device.

Additionally, a controller is provided which, before an abnormality is detected by the abnormality detector in a path electrically connected to the first power storage device, turns OFF the third switching relay and the fourth switching relay, and, when an abnormality is detected by the abnormality detector, operates the third switching relay and the fourth switching relay to be in a state reflecting the operational state of the first relay unit and the second relay unit, respectively. With this configuration, at normal times, before an abnormality is detected in a path electrically connected to the first power storage device, the third switching relay and the fourth switching relay are turned OFF in order to suppress the discharge of power from the second power storage device. When an abnormality occurs in the path electrically connected to the first power storage device, the third switching relay and the fourth switching relay can be operated in states corresponding respectively to the operations of the first switching relay and the second switching relay that were being performed up until the abnormality was detected by the abnormality detector. As a result, power can be maintained to the first specific load and the second specific load after an abnormality occurs in the same manner as before the abnormality occurred. Also, even when a switching means having a function similar to a switch is not provided in a path from the second power storage device, switching can be realized in which the state of the path from the second power storage device to each specific load (that is, the operation of the third switching relay and the fourth switching relay) after an abnormality occurs reflects the state of the path between the first power storage device and each specific load before the abnormality occurred.

Thus, a relay device can be realized, with a simpler configuration, which is able to switch or maintain a path to specific loads from a second power storage device to reflect the path to the specific loads from a first power storage device (specifically, the first specific load and the second specific load) if an abnormality occurs on the first power storage device side.

BRIEF DESCRIPTION OF THE DRAWINGS

FIGS. 4A and 4B are explanatory drawings showing the corresponding relationships between the operating states of switching relays before an abnormality occurs and after an abnormality occurs, in which FIG. 4A shows normal operations in which only the first switching relay is turned ON and FIG. 4B shows normal operations in which the first switching relay and the second switching relay are turned ON.

FIG. 5 is a block diagram schematically illustrating an onboard system in a comparative example.

DETAILED DESCRIPTION OF EMBODIMENTS

Figure 1:
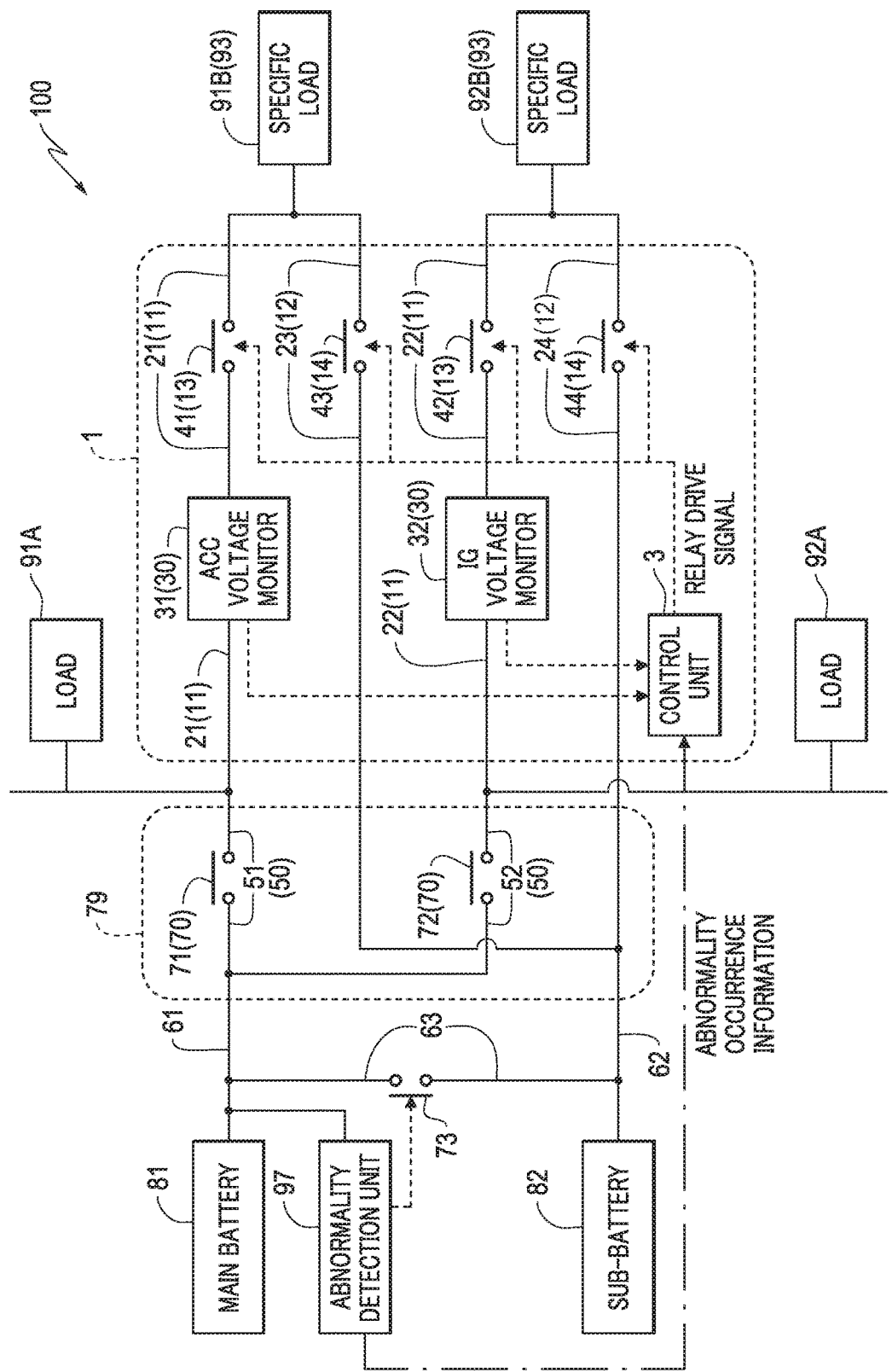
FIG. 1 is a block diagram schematically illustrating an onboard system equipped with a relay device related to Embodiment 1.

A relay device of a first invention may have a voltage detecting unit that detects the voltage on a first conductive path. A control unit may (i) before an abnormality is detected by an abnormality detecting unit, perform control that turns ON a first relay unit when a switching unit has been turned ON, and turns OFF the first relay unit when the switching unit has been turned OFF, and (ii) when an abnormality has been detected by the abnormality detecting unit, perform control that causes the second relay unit to be operated, based on the value detected by the voltage detecting unit, in a state corresponding to the operation of the first relay unit that was being performed up until the abnormality was detected by the abnormality detecting unit.

The voltage on the first conductive path is relatively low when the switching unit is turned OFF and relatively high when the switching unit is turned ON. In other words, the value detected by the voltage detecting unit is a value that can indicate whether the first relay unit is turned ON or OFF. When an abnormality has been detected by the abnormality detecting unit, the control unit grasps the value (specifically, the value indicating whether the first relay unit is turned ON or OFF), detected by the voltage detecting unit, that has this characteristic, whereby the second relay unit can be caused to operate in a state corresponding to the operation of the first relay unit that was being performed up until the abnormality was detected by the abnormality detecting unit. Additionally, with this configuration, information indicating the operating state of the switching unit does not have to be stored by the control unit in advance in a storage device or the like. Control can be performed with reference to the value detected by the voltage detecting unit just before or just after the occurrence of the abnormality. As a result, complicated processing performed in advance by the control unit can be reduced or eliminated.

A relay device of a second invention may have a first voltage detecting unit that detects the voltage on a first individual conductive path and a second voltage detecting unit that detects the voltage on a second individual conductive path. A control unit may perform control in which (i) before an abnormality is detected by the abnormality detecting unit, the first switching relay unit is turned ON or OFF depending on whether the first switching unit has been turned ON or OFF, and the second switching relay unit is turned ON or OFF depending on whether the second switching unit has been turned ON or OFF, and (ii) when an abnormality has been detected by the abnormality detecting unit, the third switching relay unit and the fourth switching relay unit are operated respectively, based on the values detected by the first voltage detecting unit and the value detected by the second voltage detecting unit, in stated corresponding to the operations of the first switching relay unit and the second switching relay unit that were being performed up until detection of the abnormality by the abnormality detecting unit.

The voltage on the first conductive path is relatively low when the first switching unit is turned OFF and relatively high when the first switching unit is turned ON. In other words, the value detected by the first voltage detecting unit is a value that can indicate whether the first switching unit is turned ON or OFF. Similarly, the voltage on the second conductive path is relatively low when the second switching unit is turned OFF and relatively high when the second switching unit is turned ON. In other words, the value detected by the second voltage detecting unit is a value that can indicate whether the second switching unit is turned ON or OFF. When an abnormality has been detected by the abnormality detecting unit, the control unit grasps the values (specifically, the values indicating whether the first switching relay unit and the second switching relay unit are turned ON or OFF), detected by the first voltage detecting unit and the second voltage detecting unit, that have these characteristics, whereby the third switching relay unit and the fourth switching relay unit can be caused to operate in a state corresponding to the operation of the first switching relay unit and the second switching relay unit up until the abnormality was detected by the abnormality detecting unit. Additionally, with this configuration, information indicating the states of the first switching unit and the second switching unit does not have to be stored by the control unit in advance in a storage device or the like. Control can be performed with reference to the values detected by the first voltage detecting unit and the second voltage detecting unit just before or just after the occurrence of the abnormality. As a result, complicated processing performed in advance by the control unit can be reduced or eliminated.

Embodiment 1

A first embodiment implementing the present invention will be described below.

An onboard system 100 shown in FIG. 1 is structured as a power supply system for a vehicle which includes multiple power supplies (a first power storage unit 81 and a second power storage unit 82). A relay device 1 forms a portion of the onboard system 100.

The first power storage unit 81 (first power storage device) functions as the main power supply that is normally used. For example, it can be formed by any known power supply, such as a lead battery or the like. In the following explanation and in the drawings, the first power storage unit 81 is sometimes referred to as the main battery or main BAT. The first power storage unit 81 is electrically connected to wiring 61 provided outside of the relay device 1, and direct current voltage is applied to the wiring 61.

A power generator (not shown) is electrically connected to the wiring 61, and power generated by the power generator is supplied to the wiring 61. The power generator can be structured as any known alternator, and the power generator is operated by an electronic control device. The power generator has a function of charging the first power storage unit 81, and also has a function of charging the second power storage unit 82 when a separation relay 73 is turned ON.

The second power storage unit 82 (second power storage device) functions as an auxiliary power supply used in times of abnormality. It can be a known power supply, such as a lithium ion battery or electric double-layer capacitor or the like. In the following explanation and in the drawings, the second power storage unit 82 is sometimes referred to as the sub-battery or sub BAT. The onboard system 100 shown in FIG. 1 has a structure in which the second power storage unit 82 can supply power to some of the loads even when there is a failure or the like on the first power storage unit 81 side and power supply to the loads from the first power storage unit 81 (power supply to the ACC loads downstream from an ACC relay 71) is interrupted. The second power storage unit 82 is electrically connected to wiring 62 provided outside of the relay device 1, and direct current voltage is applied to the wiring 62.

Power lines 50 are portions formed as paths electrically connected to the wiring 61 and branching off of the wiring 62. They include a first power line 51 and a second power line 52. The first power line 51 is a power line, among these power lines 50, on the accessory relay 71 (hereafter, also called ACC relay 71) side, and is formed as a path to supply power from the first power storage unit 81 to a plurality of ACC loads described below. The second power line 52 is a power line, among the two power lines 50, on an ignition relay 72 (hereafter, also called IG relay 72) side, and is formed as a path to supply power from the first power storage unit 81 to a plurality of IG loads described below.

The ACC relay 71 and the IG relay 72 are arranged inside a relay box 79 that performs power distribution. The ACC relay 71 and the IG relay 72 are examples of switching units, and have the function of switching a power line 50 that supplies power from the first power storage unit 81 to a plurality of loads between an electrified state and a non-electrified state.

The ACC relay 71 is an example of a first switching unit and is formed as a relay used to supply or block voltage (battery voltage) outputted from the first power storage unit 81 to a plurality of accessory system loads (hereafter, also called ACC loads). The ACC relay 71 has a function of switching the first power line 51 between an electrified state and a non-electrified state. The first power line 51 is electrified and supplies power from the first power storage unit 81 to the accessory system loads when the ACC relay 71 is turned ON. The first power line 51 is not electrified and does not supply power from the first power storage unit 81 to the accessory system loads when the ACC relay 71 is turned OFF. The ACC relay 71 is turned ON and OFF by an electronic control device (not shown).

In the onboard system 100 shown in FIG. 1, a general load 91A and a first specific load 91B are provided as the plurality of accessory system loads. The general load 91A and the first specific load 91B are examples of loads of a first type. These receive power from the first power storage unit 81 when the ACC relay 71 is turned ON. The accessory loads that are loads of the first type include a navigation system, audio equipment, an air conditioner, and the like. One or more of these loads of the first type can be selected as the first specific load 91B. There are no particular restrictions on the ACC loads serving as the first specific load 91B. However, a load should be selected that is strongly desired to continue to operate even if the first power storage unit 81 fails.

The IG relay 72 is an example of a second switching unit and is formed as a relay used to supply or block voltage (battery voltage) outputted from the first power storage unit 81 to a plurality of ignition system loads (hereafter, also called IG loads). The IG relay 72 has a function of switching the second power line 52 between an electrified state and a non-electrified state. The second power line 52 is electrified and supplies power from the first power storage unit 81 to the ignition loads when the IG relay 72 is turned ON. The second power line 52 is not electrified and does not supply power from the first power storage unit 81 to the ignition loads when the IG relay 72 is turned OFF. The IG relay 72 is turned ON and OFF by an electronic control device (not shown).

In the onboard system 100 shown in FIG. 1, a general load 92A and a second specific load 92B are provided as the plurality of ignition system loads. The general load 92A and the second specific load 92B are examples of loads of a second type. These receive power from the first power storage unit 81 when the IG relay 72 is turned ON. The ignition system loads that are loads of the second type include a steering actuator, a shift-by-wire mechanism, an electronically controlled braking system, and the like. There are no particular restrictions on the IG load serving as the second specific load 92B. However, a load should be selected that is strongly desired to continue to operate even if the first power storage unit 81 fails.

The relay device 1 has a first relay unit 13, a second relay unit 14, a voltage detecting unit 30, and a control unit 3.

The first relay unit 13 is arranged downstream from a switching unit 70 in the power supply path from the first power storage unit 81, and is formed as a relay that switches a first conductive path 11, serving as a path from the switching unit 70 to specific loads 93, between an electrified state and a non-electrified state. In the example shown in FIG. 1, a first switching relay unit 41 and a second switching relay unit 42 function as the first relay unit 13. The first conductive path 11 includes a first individual conductive path 21, serving as a path from the ACC relay 71 to the first specific load 91B, and a second individual conductive path 22, serving as a path from the IG relay 72 to the second specific load 92B.

The first switching relay unit 41 has a function of switching the first individual conductive path 21 between an electrified state and a non-electrified state. If the first switching relay 41 has been turned ON, the ACC relay 71 and the specific load 91B are connected. If the first switching relay 41 has been turned OFF, the ACC relay 71 and the specific load 91B are disconnected.

The second switching relay unit 42 has a function of switching the second individual conductive path 22 between an electrified state and a non-electrified state. If the second switching relay unit 42 has been turned ON, the IG relay 72 and the specific load 92B are connected. If the second switching relay unit 42 has been turned OFF, the IG relay 72 and the specific load 92B are disconnected.

The second relay unit 14 serves as a relay that switches a second conductive path 12, serving as a path from the second power storage unit 82 to the specific loads 93, between an electrified state and a non-electrified state. In the example shown in FIG. 1, a third switching relay unit 43 and a fourth switching relay unit 44 function as the second relay unit 14. The second conductive path 12 includes a third individual conductive path 23, serving as a path from the second power storage unit 82 to the first specific load 91B, and a fourth individual conductive path 24, serving as a path from the second power source unit 82 to the second specific load 92B.

The third switching relay unit 43 constitutes a structure that switches the third individual conductive path 23 between an electrified state and a non-electrified state. If the third switching relay unit 43 has been turned ON, the second power storage unit 82 and the first specific load 91B are connected and power is supplied from the second power storage unit 82 to the first specific load 91B. If the third switching relay unit 43 has been turned OFF, the second power storage unit 82 and the first specific load 91B are disconnected and power is not supplied from the second power storage unit 82 to the first specific load 91B.

The fourth switching relay unit 44 constitutes a structure that switches the fourth individual conductive path 24 between an electrified state and a non-electrified state. If the fourth switching relay 44 has been turned ON, the second power storage unit 82 and the second specific load 92B are connected and power is supplied from the second power storage unit 82 to the second specific load 92B. If the fourth switching relay 44 has been turned OFF, the second power storage unit 82 and the second specific load 92B are disconnected and power is not supplied from the second power storage unit 82 to the second specific load 92B.

The relay device 1 shown in FIG. 1 has voltage detecting units 30 that detect the voltage on the first conductive path 11. In the example shown in FIG. 1, a first voltage detecting unit 31 that detects voltage on the first individual conductive path 21 and a second voltage detecting unit 32 that detects voltage on the second individual conductive path 22 function as the voltage detecting units 30.

The second voltage detecting unit 32 is formed as a known voltage detecting circuit. In FIG. 1, the second voltage detecting unit 32 is also referred to as an IG voltage monitor. The second voltage detecting unit 32 outputs a voltage value on the second individual conductive path 22 at a position between the IG relay 72 and the second switching relay unit 42 as a detected value, and the voltage value detected by the second voltage detecting unit 32 is input to the control unit 3.

The second voltage detecting unit 32 can be a voltage detecting circuit common in the art. In FIG. 1, the second voltage detecting unit 32 is also referred to as the IG voltage monitor. The second voltage detecting unit 32 outputs a voltage value in the second individual conductive path 22 at a position between the IG relay 72 and the second switching relay unit 42 as the voltage value, and inputs the voltage value detected by the second voltage detecting unit 32 to the control unit 3.

The control unit 3 is, for example, formed as a control unit including a CPU. The value detected by the first voltage detecting unit 31 and the value detected by the second voltage detecting unit 32 are input to the control unit 3, and based on these detected values, the control unit 3 can control the switching of the first switching relay unit 41, the second switching relay unit 42, the third switching relay unit 43, and the fourth switching relay unit 44.

The separation relay 73 has a function of switching wiring 63, serving as a path from the wiring 61 connected to the first power storage unit 81 (main battery) to the wiring 62 connected to the second power storage unit 82 (sub-battery), between an electrified state and a non-electrified state. The separation relay 73 can be turned ON and OFF by, for example, a control device (not shown). When the separation relay 73 is turned ON, the path from the wiring 61 to the wiring 62 is electrified, and charging current from the first power storage unit 81 or a power generator (not shown) is supplied to the second power storage unit 82 via the wiring 63. When the separation relay 73 is turned OFF, the path from the wiring 61 to the wiring 62 is not electrified, and the supply of current from the first power storage unit 81 to the second power storage unit 82 is blocked. There are no particular restrictions on the timing used by the control device (not shown) to turn the separation relay 73 ON and OFF. As one example, the separation relay 73 can be turned OFF for a period from a point at which the output voltage from the second power storage unit 82 exceeds a predetermined full charge threshold value to a point at which the output voltage falls below a predetermined charge start threshold value, and the separation relay 73 can be turned ON for a period from the point at which the output voltage from the second power storage unit 82 falls below the predetermined charge start threshold value to a point at which the output voltage exceeds the predetermined full charge threshold value.

An abnormality detecting unit 97 detects abnormalities in the path electrically connected to the first power storage unit 81. The abnormality detecting unit 97 has, for example, a voltage detecting circuit that detects the voltage in the wiring 61, a control device that performs control at a time of abnormality so as to forcibly turn OFF the separation relay 73 when the value detected by the voltage detecting circuit is within a predetermined abnormal range, and the like. The control device that can perform the control at times of abnormality is configured to output a normal signal to the control unit 3 when the voltage in the wiring 61 is within a predetermined normal range (for example, at or above a predetermined voltage threshold value indicating failure of the power supply), and to output an abnormal signal (abnormality occurrence information) to the control unit 3 and forcibly shuts OFF the separation relay 73 when the voltage in the wiring 61 is within a predetermined abnormal range (for example, below the predetermined voltage threshold value indicating failure of the power supply). The control unit 3 is configured to be able to receive normal signals and abnormal signals (abnormality occurrence information) output from the abnormality detecting unit 97.

The basic operation of the relay device 1 when the situation is normal will now be explained.

In the onboard system 100 shown in FIG. 1, the ACC relay 71 is turned ON when a predetermined first operation (ACC ON operation) has been performed using an operation unit (not shown) inside the vehicle, and battery voltage is supplied to the ACC loads provided downstream from the ACC relay 71. Both the ACC relay 71 and the IG relay 72 are turned ON when a predetermined second operation (IG ON operation) has been performed using the operation unit (not shown) inside the vehicle, and battery voltage is supplied to the ACC loads provided downstream from the ACC relay 71 and to the IG loads provided downstream from the IG relay 72. The ACC relay 71 and the IG relay 72 are both turned OFF when neither the first operation nor the second operation is performed.

The control unit 3 sets the first relay unit 13 to a state corresponding to the switching unit 70 when an abnormality has not been detected by the abnormality detecting unit 97, that is, when the output voltage applied from the first power storage unit 81 to the wiring 61 is within a predetermined normal range (for example, at or above a predetermined voltage threshold value indicating failure of the power supply). Specifically, the control unit 3 turns the first switching relay unit 41 ON or OFF to correspond to the ON or OFF operation of the ACC relay 71. It turns ON the first switching relay unit 41 when the ACC relay 71 is turned ON, and it turns OFF the first switching relay unit 41 when the ACC relay 71 is turned OFF. Similarly, the control unit 3 turns the second switching relay unit 42 ON or OFF to correspond to the ON or OFF operation of the IG relay 72. It turns ON the second switching relay unit 42 when the IG relay 72 is turned ON, and it turns OFF the second switching relay unit 42 when the IG relay 72 is turned OFF.

Also, the control unit 3 keeps both the third switching relay unit 43 and the fourth switching relay unit 44, functioning as the second relay unit 14, turned OFF when an abnormality has not been detected by the abnormality detecting unit 97, that is, when the voltage value output from the first power storage unit 81 is within the predetermined normal range.

Figure 2:
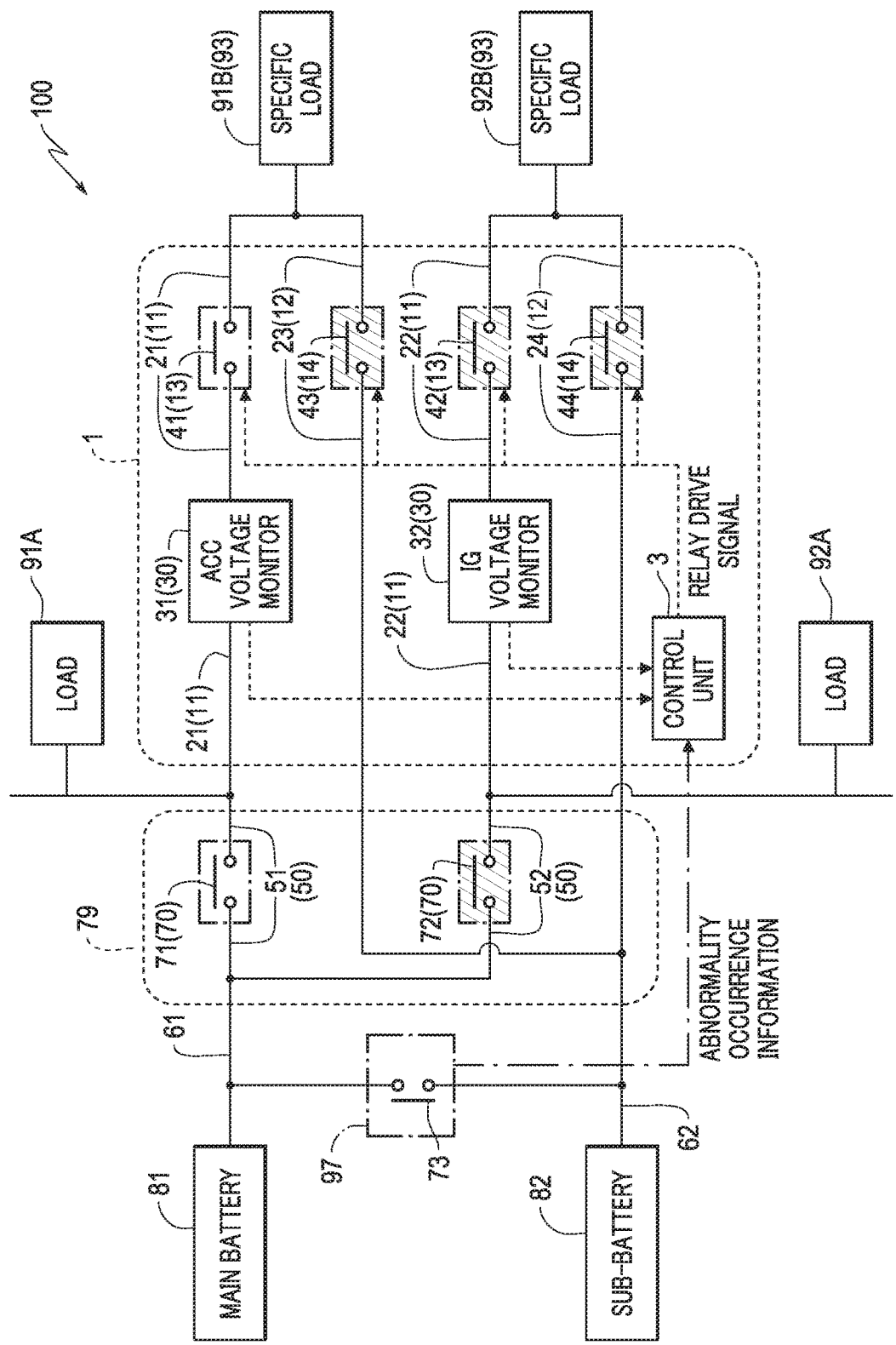
FIG. 2 is an explanatory diagram schematically illustrating an example of normal operations in the onboard system in FIG. 1.

FIG. 2 is an explanatory diagram schematically illustrating an example of normal operations in the onboard system 100. In the explanatory diagram shown in FIG. 2, the ACC relay 71 has been turned ON and the IG relay 72 has been turned OFF. A relay that has been turned OFF is indicated by cross-hatching. The abnormality detecting unit 97 is shown in simplified form. In the situation shown in FIG. 2, the first switching relay unit 41 is turned ON in response to the ACC relay 71 having been turned ON, and the second switching relay unit 42 is turned OFF in response to the IG relay 72 having been turned OFF. Both the third switching relay unit 43 and the fourth switching relay unit 44 have been turned OFF.

In this way, the control unit 3 controls ON and OFF operations of the first switching relay unit 41, the second switching relay unit 42, the third switching relay unit 43, and the fourth switching relay unit 44 based on the states of the ACC relay 71 and the IG relay 72 when an abnormality has not been detected by the abnormality detecting unit 97. In a normal state, power supplied via the third individual conductive path 23 and the fourth individual conductive path 24 is blocked, and among the first individual conductive path 21 and the second individual conductive path 22, each conductive path for which the switching unit 70 at the upstream side has been turned ON becomes a path that supplies power.

The following is an explanation of the operation of relay device 1 at the time of an abnormality.

When an abnormality has been detected by the abnormality detecting unit 97, that is, when the output voltage from the first power storage unit 81 applied to the wiring 61 is within a predetermined abnormal range (for example, below a predetermined voltage threshold value indicating failure of the power supply), the control unit 3 causes the second relay unit 14 to operate in the same manner as the operation of the first relay unit 13 that was performed up until the abnormality detecting unit 97 detected the abnormality. Specifically, the third switching relay unit 43 and the fourth switching relay unit 44 functioning as the second relay unit 14 are operated in the same manner as the operations of the first switching relay unit 41 and the second switching relay unit 42 that were performed up until the abnormality detecting unit 97 detected the abnormality.

When an abnormality has been detected by the abnormality detecting unit 97, the control unit 3 confirms the values respectively detected by the first voltage detecting unit 31 and the second voltage detecting unit 32 when the abnormality was detected. For this confirmation, the respective values detected by the first voltage detecting unit 31 and the second voltage detecting unit 32 at the time the abnormality was detected (for example, the time at which the abnormality signal was obtained from the abnormality detecting unit 97) may be confirmed, or the values detected by the first voltage detecting unit 31 and the second voltage detecting unit 32 at a time right before the abnormality was detected may be confirmed based on continually monitored results.

If the value detected by the first voltage detecting unit 31 is at or above a predetermined first threshold value when an abnormality is detected by the abnormality detecting unit 97, it can be assumed that the ACC relay 71 was ON and the first switching relay unit 41 was ON at the time the abnormality was detected by the abnormality detecting unit 97. Therefore, in this situation, the control unit 3 turns the third switching relay unit 43 ON and the first switching relay unit 41 OFF. Conversely, if the value detected by the first voltage detecting unit 31 is below the predetermined first threshold value when the abnormality is detected by the abnormality detecting unit 97, it can be assumed that the ACC relay 71 was OFF and the first switching relay unit 41 was OFF at the time the abnormality was detected by the abnormality detecting unit 97. Therefore, in this situation, the third switching relay unit 43 is kept turned OFF and the first switching relay unit 41 is also kept turned OFF.

If the value detected by the second voltage detecting unit 32 is at or above a predetermined second threshold value when an abnormality is detected by the abnormality detecting unit 97, it can be assumed that the IG relay 72 was ON and the second switching relay unit 42 was ON at the time the abnormality was detected by the abnormality detecting unit 97. Therefore, in this situation, the control unit 3 turns the fourth switching relay unit 44 ON and the second switching relay unit 42 OFF. Conversely, if the value detected by the second voltage detecting unit 32 is below the predetermined second threshold value when an abnormality is detected by the abnormality detecting unit 97, it can be assumed that the IG relay 72 was OFF and the second switching relay unit 42 was OFF when the abnormality was detected by the abnormality detecting unit 97. Therefore, in this situation, the fourth switching relay unit 44 is kept turned OFF and the second switching relay unit 42 is also kept turned OFF.

Figure 3:
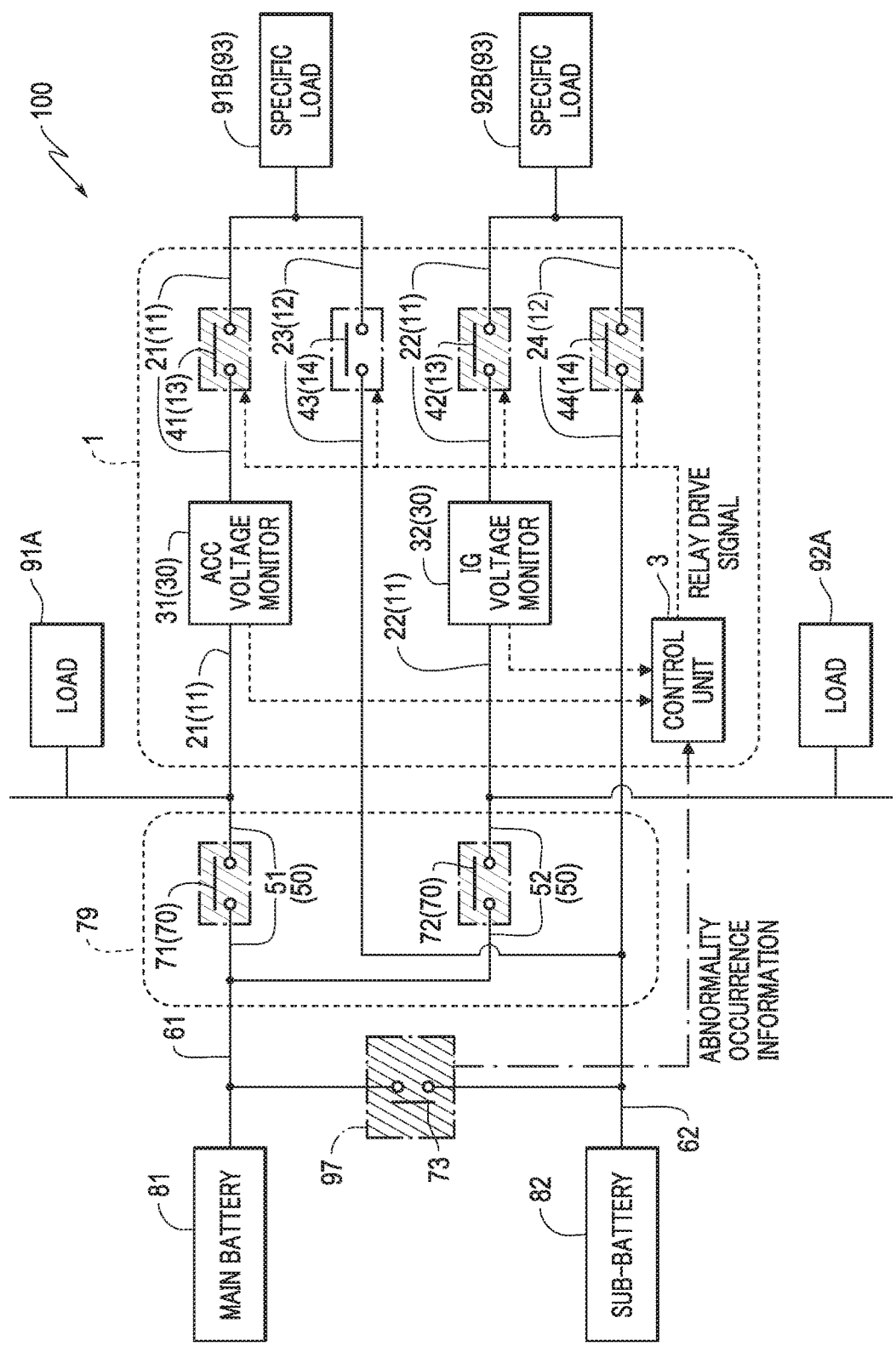
FIG. 3 is an explanatory diagram schematically illustrating the switching of relays when an abnormality occurs while the onboard system in FIG. 1 is operating in the state shown in FIG. 2.
Figure 6:
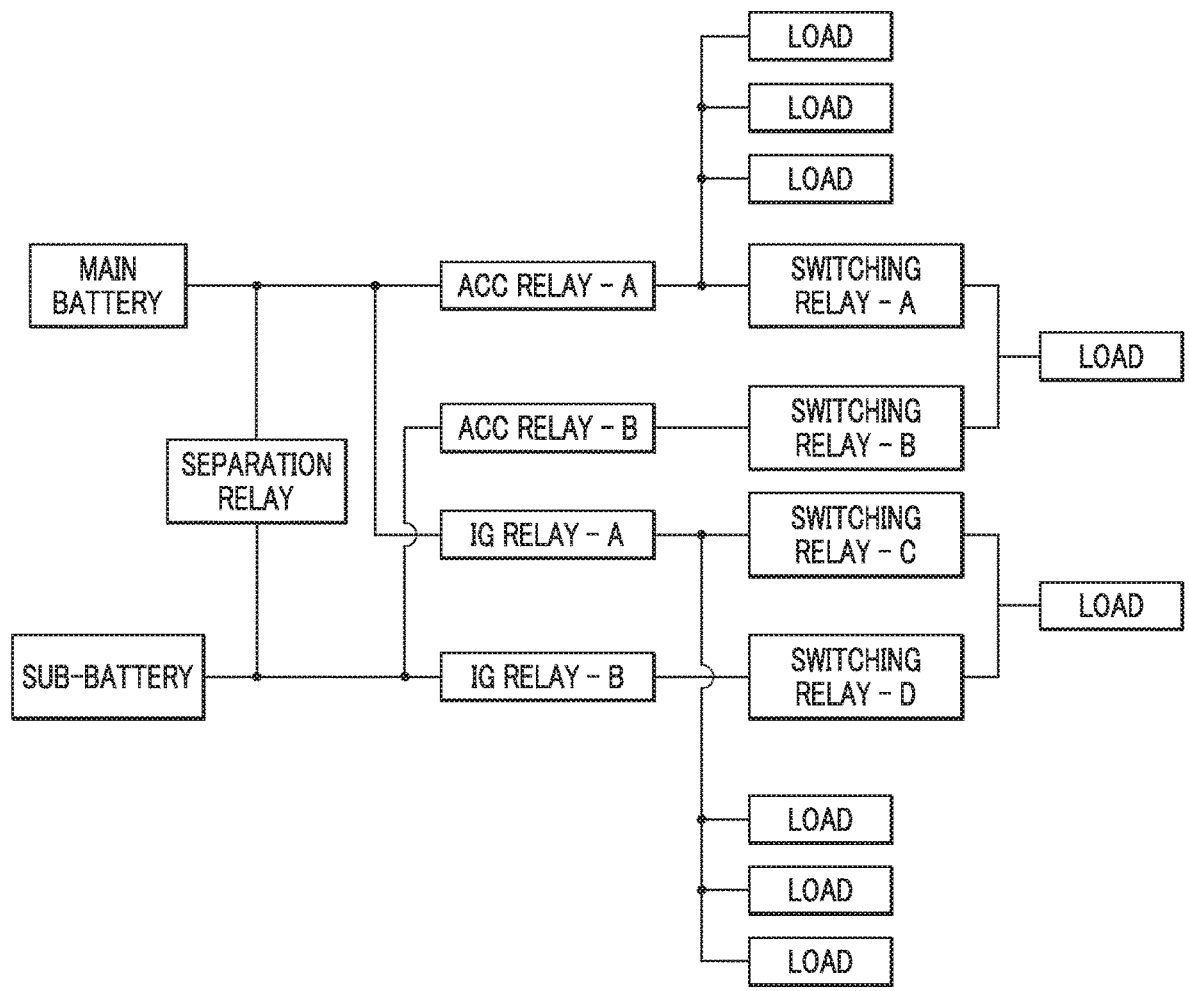
FIG. 6 is a block diagram schematically illustrating an onboard system in a comparative example different from the one in FIG. 5.

FIG. 3 shows the operational state immediately after an abnormality has been detected by the abnormality detecting unit 97 in the operational state shown in FIG. 2. In this drawing as well, relays that have been turned OFF are indicated using cross-hatching. The abnormality detecting unit 97 has also been simplified. When an abnormality has been detected by the abnormality detecting unit 97 in the operational state shown in FIG. 2, the third switching relay unit 43, as shown in FIG. 3, is turned ON to correspond to the operation of the first switching relay unit 41 (that is, the ON operation in FIG. 2) that was being performed up until the abnormality was detected by the abnormality detecting unit 97. Also, the fourth switching relay unit 44 is turned OFF to correspond to the operation of the second switching relay unit 42 (that is, the OFF operation in FIG. 2) that was being performed up until the abnormality was detected by the abnormality detecting unit 97.

Thus, when an abnormality has been detected by the abnormality detecting unit 97 (abnormal state), the control unit 3 turns ON or OFF the first switching relay unit 41, the second switching relay unit 42, the third switching relay unit 43, and the fourth switching relay unit 44 based on the information obtained from the abnormality detecting unit 97 and the values detected by the first voltage detecting unit 31 and the second voltage detecting unit 32. FIGS. 4 show a simplified summary of the transition in the switching states. FIG. 4 (A) shows operation examples of the four switching relays before the abnormality occurred, and, when an abnormality was detected by the abnormality detecting unit 97 while each switching relay was in that operational state, the operational states after the abnormality has occurred. FIG. 4 (B) shows an example other than the one in FIG. 4 (A), and shows operation examples of the four switching relays before the abnormality occurred, and, when the abnormality was detected by the abnormality detecting unit 97 while each switching relay was in that operational state, the operational states after the abnormality has occurred.

As mentioned above, a relay device 1 with this configuration is provided with the first switching relay unit 41 that switches the first individual conductive path 21, serving as a path from the ACC relay 71 to the first specific load 91B, between an electrified state and a non-electrified state, and the third switching relay unit 43 that switches the third individual conductive path 23, serving as a path from the second power storage unit 82 to the first specific load 91B, between an electrified state and a non-electrified state. With this configuration, electric power can be supplied to the first specific load 91B not only from the first power storage unit 81 but also from the second power storage unit 82.

There are also provided the second switching relay unit 42 that switches the second individual conductive path 22, serving as a path from the IG relay 72 to the second specific load 92B, between an electrified state and a non-electrified state, and the fourth switching relay unit 44 that switches a fourth individual conductive path 24, serving as a path from the second power storage unit 82 to the second specific load 92B, between an electrified state and a non-electrified state. With this configuration, electric power can be supplied to the second specific load 92B not only from a first power storage unit 81 but also from the second power storage unit 82.

There is also provided the control unit 3 that turns OFF the third switching relay unit 43 and the fourth switching relay unit 44 before an abnormality is detected by the abnormality detecting unit 97. When an abnormality is detected by the abnormality detecting unit 97, the control unit 3 respectively causes the third switching relay unit 43 and the fourth switching relay unit 44 to operate in a manner corresponding to the respective operations of the first relay unit 13 and the second switching relay unit 42 that were being performed up until the abnormality was detected by the abnormality detecting unit 97. With this configuration, the third switching relay unit 43 and the fourth switching relay unit 44 can be turned OFF during normal operation before an abnormality occurs in the path electrically connected to the first power storage unit 81 to suppress the discharge of power from the second power storage unit 82. When an abnormality has occurred in the path electrically connected to the first power storage unit 81, the third switching relay unit 43 and the fourth switching relay unit 44 can be operated in a manner corresponding to the operations of the first switching relay unit 41 and the second switching relay unit 42 that were being performed up until the abnormality was detected by the abnormality detecting unit 97. In this way, the state of power supply to the first specific load 91B and the second specific load 92B after an abnormality has occurred can be maintained in the same manner as before the abnormality occurred. Also, even when a switching means having a function similar to that of the switching unit 70 is not provided in the path from the second power storage unit 82, switching can be realized in which the state of the path from the second power storage unit 82 to the specific loads (that is, the operation of the third switching relay unit 43 and the fourth switching relay unit 44) after an abnormality occurs reflects the state of the path from the first power storage unit 81 to the specific loads before the abnormality occurred.

Thus, the present invention is able to realize, with a simpler configuration, a relay device 1 which is able to switch or maintain paths to specific loads (specifically, the first specific load 91B and the second specific load 92B, respectively) from a second power storage unit 82 to reflect the path to the specific loads from the first power storage unit 81 if an abnormality occurs on the first power storage unit 81 side.

The relay device 1 has the first voltage detecting unit 31 that detects voltage on the first individual conductive path 21 and the second voltage detecting unit 32 that detects voltage on the second individual conductive path 22. When an abnormality has been detected by the abnormality detecting unit 97, the control unit 3 causes the third switching relay unit 43 and the fourth switching relay unit 44 to respectively operate in a manner corresponding to the respective operations of the first switching relay unit 41 and the second switching relay unit 42 that were being performed up until the abnormality was detected by the abnormality detecting unit 97, based on the value detected by the first voltage detecting unit 31 and the value detected by the second voltage detecting unit 32.

The voltage on the first individual conductive path 21 is relatively low when the ACC relay 71 is turned OFF and relatively high when the ACC relay 71 is turned ON. In other words, the value detected by the first voltage detecting unit 31 can be used to determine whether the ACC relay 71 is ON or OFF. Similarly, the voltage on the second individual conductive path 22 is relatively low when the IG relay 72 is turned OFF and relatively high when the IG relay 72 is turned ON. In other words, the value detected by the second voltage detecting unit 32 can be used to determine whether the IG relay 72 is ON or OFF.

When an abnormality has been detected by the abnormality detecting unit 97, the control unit 3 grasps the values, detected by the first voltage detecting unit 31 and the second voltage detecting unit 32, with these characteristics (that is, the values indicating whether the first switching relay unit 41 and the second switching relay unit 42 are turned ON or OFF), whereby the control unit 3 can respectively cause the third switching relay unit 43 and the fourth switching relay unit 44 to operate in a manner corresponding to the respective operations of the first switching relay unit 41 and the second switching relay unit 42 that were being performed up until the abnormality was detected by the abnormality detecting unit 97. Additionally, information indicating the operating states of the ACC relay 71 and the IG relay 72 does not have to be stored in a storage device in advance, and the control unit 3 can perform control with reference to the respective values detected by the first voltage detecting unit 31 and the second voltage detecting unit 32 just before or just after the abnormality occurred. As a result, the performance of complicated processing by the control unit 3 in advance can be reduced or eliminated.

Other Embodiments

The present invention is not restricted to the examples explained above with reference to the drawings. For example, the following examples are within the technical scope of the present invention.

(1) In the embodiments described above, when an abnormality has been detected by the abnormality detecting unit 97, the control unit 3 respectively causes the third switching relay unit 43 and the fourth switching relay unit 44 to operate in a manner corresponding to the respective operations of the first switching relay unit 41 and the second switching relay unit 42 that were being performed up until the abnormality was detected by the abnormality detecting unit 97, based on the value detected by the first voltage detecting unit 31 and the value detected by the second voltage detecting unit 32. However, the examples are not limited to this method. For example, a storage unit that can store information indicating the operational states of the ACC relay 71 and the IG relay 72 may be provided inside or outside the control unit 3, and the control unit 3 can update the stored information in the storage unit every time the operational states of the ACC relay 71 and the IG relay 72 change. In this way, when an abnormality has been detected by the abnormality detecting unit 97, the control unit 3 can grasp the operational states of the first switching relay unit 41 and the second switching relay unit 42 that were being performed up until the abnormality was detected based on the content of the storage unit and control the third switching relay unit 43 and the fourth switching relay unit 44 to reflect those states.

(2) In the embodiments described above, the abnormality detecting unit 97 detected the voltage in the wiring 61. However, the abnormality detecting unit 97 may be configured to be able to detect the current in the wiring 61. For example, the abnormality detecting unit 97 may be configured to output an abnormality signal (abnormality occurrence information) when overcurrent exceeding a predetermined current threshold value is generated in the wiring 61.

(3) In the embodiments described above, the abnormality detecting unit 97 was configured to be able to detect an abnormality when the voltage in the wiring 61 is in a low voltage range below a predetermined threshold value. However, the abnormality detecting unit 97 may be configured to output an abnormality signal (abnormality occurrence information) when the voltage in the wiring 61 is in a predetermined overvoltage state.

(4) In the embodiments described above, specific loads were connected downstream from the ACC relay 71 and the IG relay 72 respectively. However, a specific load may be connected downstream from only one of these relays. For example, the first specific load 91B does not have to be connected downstream from the ACC relay 71. In this situation, the third individual conductive path 23 can be eliminated.

(5) In the embodiments described above, the separation relay 73 was controlled by a control device (not shown). However, the functions of this control device can be incorporated into the control unit 3.

(6) In the embodiments described above, the separation relay 73 was controlled by a control device (not shown). However, the functions of this control device can be incorporated into the control unit 3.

Description of Symbols

1: Relay device
3: Control unit (abnormality detecting unit) (controller, abnormality detector)
11: First conductive path
12: Second conductive path
13: First relay unit (first relay)
14: Second relay unit (second relay)
21: First individual conductive path
22: Second individual conductive path
23: Third individual conductive path
24: Fourth individual conductive path
30: Voltage detecting unit (voltage detector)
31: First voltage detecting unit (first voltage detector)
32: Second voltage detecting unit (second voltage detector)
41: First switching relay unit (first switching relay)
42: Second switching relay unit (second switching relay)
43: Third switching relay unit (third switching relay)
44: Fourth switching relay unit (fourth switching relay)
50: Power line
51: First power line
52: Second power line
70: Switching unit (switch)
71: ACC relay (first switching unit) (first switch)
72: IG relay (second switching unit) (second switch)
81: First power storage unit (first power storage device)
82: Second power storage unit (second power storage device)
91A: ACC load (first type of load)
91B: First specific load (first type of load)

92A: IG load (first type of load)
92B: Second specific load (second type of load)
97: Abnormality detecting unit (abnormality detector)

What is claimed is:

1. A relay device comprising:
a switch that switches a power line, serving as a path for power supplied from a first power storage device to a plurality of loads, between an electrified state and a non-electrified state,
a first relay that switches a first conductive path, serving as a path from the switch to at least one specific load, between an electrified state and a non-electrified state,
a second relay that switches a second conductive path, serving as a path between a second power storage device and the at least one specific load, between an electrified state and a non-electrified state, and
a controller that causes the operation of the second relay to be turned OFF until an abnormality is detected by an abnormality detector, and, when the abnormality has been detected by the abnormality detector, causes the second relay to operate in a manner corresponding to the operation of the first relay that was being performed before detection of the abnormality by the abnormality detector, wherein:
the controller is configured to detect a state of the switch,
before the abnormality is detected by the abnormality detector, the controller causes the first relay to be turned ON when the switch has been turned ON, and causes the first relay to be turned OFF when the switch has been turned OFF, and
when the abnormality has been detected by the abnormality detector, the controller causes the second relay to operate in a manner corresponding to the operation of the first relay that was being performed up until detection of the abnormality by the abnormality detector, based on the state of the switch detected by the controller.

2. A relay device according to claim 1, further comprising a voltage detector that detects a voltage of the first conductive path,
wherein, before the abnormality is detected by the abnormality detector, the controller turns ON the first relay when the switch is ON, and turns OFF the first relay when the switch is OFF, and
when the abnormality has been detected by the abnormality detector, the controller causes the second relay to operate in a manner corresponding to the operation of the first relay that was being performed up until detection of the abnormality by the abnormality detector, based on a value detected by the voltage detector.

3. A relay device comprising:
a first switch that switches a first power line, serving as a path for power supplied from a first power storage device to a plurality of loads of a first type, between an electrified state and a non-electrified state,
a first switching relay that switches a first individual conductive path, serving as a path from the first switch to a first specific load, between an electrified state and a non-electrified state,
a second switch that switches a second power line, serving as a path for power supplied from the first power storage device to a plurality of loads of a second type, between an electrified state and a non-electrified state,
a second switching relay that switches a second individual conductive path, serving as a path from the second switch to a second specific load, between an electrified state and a non-electrified state,
a third switching relay that switches a third individual conductive path, serving as a path from a second power storage device to the first specific load, between an electrified state and a non-electrified state, and
a fourth switching relay that switches a fourth individual conductive path, serving as a path from the second power storage device to the second specific load, between an electrified state and a non-electrified state, and
a controller that causes the operation of the third switching relay and the fourth switching relay to be turned OFF until an abnormality is detected by an abnormality detector, and, when the abnormality has been detected by the abnormality detector, causes the third switching relay and the fourth switching relay to operate in a manner corresponding, respectively, to the operations of the first switching relay and the second switching relay that were being performed before detection of the abnormality by the abnormality detector, wherein:
the controller is configured to detect a state of the first switching relay and the second switching relay,
until the abnormality is detected by the abnormality detector, the controller causes the operation of the first switching relay to be turned OFF and ON in a manner corresponding to the OFF and ON operation of the first switch, and causes the operation of the second switching relay to be turned OFF and ON in a manner corresponding to the OFF and ON operation of the second switch, and
when an abnormality has been detected by the abnormality detector, the controller respectively causes the third switching relay and the fourth switching relay to operate in a manner corresponding to the respective operations of the first switching relay and the second switching relay that were being performed up until detection of the abnormality by the abnormality detector, based on the state of the first switching relay and the second switching relay detected by the controller.

4. A relay device according to claim 3, further comprising:
a first voltage detector that detects a voltage of the first individual path, and
a second voltage detector that detects a voltage of the second individual path,
wherein, until the abnormality is detected by the abnormality detector, the controller causes the operation of the first switching relay to be turned OFF and ON in a manner corresponding to the OFF and ON operation of the first switch and causing the operation of the second switching relay to be turned OFF and ON in a manner corresponding to the OFF and ON operation of the second switch, and
when the abnormality has been detected by the abnormality detector, the controller respectively causes the third switching relay and the fourth switching relay to operate in a manner corresponding to the operations of the first switching relay and the second switching relay that were being performed up until the detection of the abnormality by the abnormality detector, based on the value detected by the first voltage detector and the value detected by the second voltage detector, respectively.

* * * * *